US010908421B2

(12) United States Patent
Boger et al.

(10) Patent No.: US 10,908,421 B2
(45) Date of Patent: Feb. 2, 2021

(54) SYSTEMS AND METHODS FOR PERSONAL VIEWING DEVICES

(75) Inventors: Yuval S. Boger, Baltimore, MD (US); Meir Machlin, Herzliya (IL); Lawrence G. Brown, Towson, MD (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 1849 days.

(21) Appl. No.: 13/160,314

(22) Filed: Jun. 14, 2011

(65) Prior Publication Data
US 2011/0241976 A1 Oct. 6, 2011

Related U.S. Application Data

(63) Continuation-in-part of application No. 11/934,373, filed on Nov. 2, 2007, now abandoned.
(Continued)

(51) Int. Cl.
*G02B 27/01* (2006.01)
*G06F 3/14* (2006.01)

(52) U.S. Cl.
CPC ..... *G02B 27/0172* (2013.01); *G02B 27/0176* (2013.01); *G06F 3/1446* (2013.01);
(Continued)

(58) Field of Classification Search
CPC ...... G02B 2027/0134; G02B 2027/138; G09G 2340/125
(Continued)

(56) References Cited

U.S. PATENT DOCUMENTS

| 4,870,768 A | 10/1989 | Watt et al. |
| 4,893,913 A * | 1/1990 | Clark ................ G02B 21/22 |
| | | 359/377 |

(Continued)

FOREIGN PATENT DOCUMENTS

GB 2 376 397 A 12/2002

OTHER PUBLICATIONS

Choquet, C., "ARC+®: Today's Virtual Reality Solution for Welders", [online] [Retrieved on Apr. 27, 2016] Retrieved from the Internet :< URL: http://www.123arc.com/wp-content/uploads/2016/08/iiw2008_16v08.pdf, Published in 2008, 6 pages.
(Continued)

*Primary Examiner* — William Boddie
*Assistant Examiner* — Bipin Gyawali
(74) *Attorney, Agent, or Firm* — Polsinelli PC

(57) ABSTRACT

Images are overlaid using a personal viewing device, such as a head mounted display. The personal viewing device includes a mount, an electronic display, a lens, and an electronic circuit. The electronic display, lens, and electronic circuit are physically attached to the mount. The electronic display and lens are positioned by the mount so that an eye views the electronic display through the lens. The electronic circuit overlays a first image with a second image to produce an overlaid image. The electronic circuit then displays the overlaid image on the electronic display. The electronic circuit can include an image generating device. The image generating device can generate the first image and/or the second image. The image generating device can be a video player or a processor. The personal viewing device can further include a wireless transceiver attached to the mount.

20 Claims, 10 Drawing Sheets

Related U.S. Application Data

(60) Provisional application No. 60/944,853, filed on Jun. 19, 2007, provisional application No. 60/856,021, filed on Nov. 2, 2006.

(52) U.S. Cl.
CPC ............... *G02B 2027/0123* (2013.01); *G02B 2027/0134* (2013.01); *G02B 2027/0138* (2013.01); *G09G 2340/125* (2013.01)

(58) Field of Classification Search
USPC ...................................... 345/7, 55, 204, 690
See application file for complete search history.

(56) References Cited

U.S. PATENT DOCUMENTS

| | | | |
|---|---|---|---|
| 5,130,794 A * | 7/1992 | Ritchey ........................... 348/39 |
| 5,296,854 A * | 3/1994 | Hamilton et al. ............. 340/980 |
| 5,581,399 A | 12/1996 | Abe |
| 5,659,639 A | 8/1997 | Mahoney et al. |
| 5,708,449 A | 1/1998 | Heacook et al. |
| 5,796,426 A | 8/1998 | Gullichsen et al. |
| 5,880,883 A | 3/1999 | Sudo |
| 5,905,525 A * | 5/1999 | Ishibashi ................ H04N 5/232 345/8 |
| 5,914,725 A | 6/1999 | Macinnis et al. |
| 5,956,431 A | 9/1999 | Iourcha et al. |
| 6,166,744 A | 12/2000 | Jaszlics et al. |
| 6,290,357 B1 * | 9/2001 | Massengill et al. .......... 351/209 |
| 6,330,022 B1 * | 12/2001 | Seligmann ............. H04N 7/147 348/14.08 |
| 6,467,913 B1 | 10/2002 | Holden et al. |
| 6,529,331 B2 | 3/2003 | Massof et al. |
| 6,771,294 B1 * | 8/2004 | Pulli ....................... G06F 3/011 345/173 |
| 6,826,532 B1 | 11/2004 | Casby et al. |
| 7,061,674 B2 | 6/2006 | Mogamiya |
| 7,512,902 B2 | 3/2009 | Robertson et al. |
| 7,817,167 B2 | 10/2010 | Suzuki et al. |
| 7,969,383 B2 | 6/2011 | Eberl et al. |
| 8,004,492 B2 | 8/2011 | Kramer et al. |
| 8,046,719 B2 | 10/2011 | Skourup et al. |
| 8,085,902 B2 | 12/2011 | Bonfiglio et al. |
| 8,099,668 B2 | 1/2012 | Garbow et al. |
| 8,325,415 B2 * | 12/2012 | Hengst .................... G02B 23/18 359/410 |
| 8,747,116 B2 | 6/2014 | Zboray et al. |
| 2001/0012011 A1 | 8/2001 | Leavy |
| 2001/0055152 A1 * | 12/2001 | Richards ............ G02B 27/0093 359/462 |
| 2002/0090985 A1 | 7/2002 | Tochner |
| 2002/0113755 A1 * | 8/2002 | Lee ........................ G02B 7/12 345/7 |
| 2002/0181115 A1 | 12/2002 | Massof et al. |
| 2003/0043058 A1 * | 3/2003 | Jamieson .............. G01S 17/933 340/961 |
| 2003/0043268 A1 | 3/2003 | Mann |
| 2005/0078378 A1 | 4/2005 | Geist |
| 2005/0102177 A1 * | 5/2005 | Takayama ....................... 705/14 |
| 2005/0207031 A1 | 9/2005 | Eckhardt et al. |
| 2005/0245302 A1 | 11/2005 | Bathiche et al. |
| 2006/0009702 A1 | 1/2006 | Iwaki et al. |
| 2006/0061555 A1 | 3/2006 | Mullen |
| 2006/0159307 A1 * | 7/2006 | Anderson et al. ............ 382/101 |
| 2007/0003159 A1 * | 1/2007 | Matsuda ................. G06T 5/006 382/275 |
| 2007/0018880 A1 * | 1/2007 | Huston .............. A63B 24/0021 342/45 |
| 2007/0041444 A1 * | 2/2007 | Gutierrez Novelo ........................ H04N 19/597 375/240.15 |
| 2007/0081238 A1 * | 4/2007 | Gebelein .............. G02B 23/125 359/412 |
| 2007/0120974 A1 | 5/2007 | Chen |
| 2008/0038702 A1 | 2/2008 | Choquet |
| 2008/0091550 A1 * | 4/2008 | Zacarias ................ G06Q 30/08 705/26.3 |
| 2008/0094417 A1 | 4/2008 | Cohen |
| 2008/0106489 A1 | 5/2008 | Brown et al. |
| 2009/0011389 A1 * | 1/2009 | Sizov ............................. 434/66 |
| 2009/0059364 A1 | 3/2009 | Brown et al. |
| 2009/0091571 A1 | 4/2009 | Zalewski |
| 2010/0110368 A1 | 5/2010 | Chaum |
| 2010/0159434 A1 | 6/2010 | Lampotang |
| 2010/0182340 A1 | 7/2010 | Bachelder et al. |
| 2011/0241976 A1 | 10/2011 | Bachelder et al. |
| 2012/0113223 A1 | 5/2012 | Hilliges et al. |
| 2012/0120499 A1 * | 5/2012 | Harrison ................ G02B 17/06 359/631 |

OTHER PUBLICATIONS

State, A. et al., "Dynamic Virtual Convergence for Video See-through Head-mounted Displays: Maintaining Maximum Stereo Overlap throughout a Close-range Work Space", [online] [Retrieved on Mar. 8, 2017] Retrieved from the Internet :< URL: , http://www.cs.unc.edu/~andrei/pubs/2001_ISAR_dyn-conv.pdf, Published in 2001. 10 pages.

Rolland, J. et al., "A Comparison of optical and video see-through, head-mounted displays", Proceedings of SPIE—The International Society for Optical Engineering, SPIE vol. 2351, 1994, pp. 293-307.

Tag Archive: 1995, VR-tifacts.com, [online] [Retrieved on Mar. 8, 2017] Retrieved from the Internet< URL: http://vrtifacts.com/tag/1995/page/2/?lang=ht, 9 pages.

Bungert, C., "HMD/headset/VR-helmet Comparison Chart", [online] [Retrieved on Mar. 8, 2017] Retrieved from the Internet< URL: http://www.stereo3d.com/hmd.htm, 10 pages.

"Dark Souls" Video Game, Released on Sep. 22, 2011, developed by FromSoftware and published by Namco Bandai Games.

Extended European Search Report dated May 4, 2015 for European Application No. 12771791.6—1553.

Office Action for U.S. Appl. No. 12/263,711, dated Dec. 23, 2011.

Office Action for U.S. Appl. No. 11/934,373, dated Jul. 1, 2011.

Office Action for U.S. Appl. No. 11/934,373, dated Feb. 9, 2011.

International Search Report for International Application No. PCT/US2011/040438, dated Mar. 28, 2012.

International Search Report and Written Opinion for International Application No. PCT/US2007/083500, dated Aug. 18, 2008.

International Search Report and Written Opinion for International Application No. PCT/US12/33185, dated Jul. 18, 2012.

* cited by examiner

SYSTEMS AND METHODS FOR PERSONAL VIEWING DEVICES

CROSS REFERENCE TO RELATED APPLICATION

This application is a continuation-in-part application of U.S. patent application Ser. No. 11/934,373 filed Nov. 2, 2007 now abandoned, which claims the benefit of U.S. Provisional Patent Application Ser. No. 60/856,021 filed Nov. 2, 2006 and U.S. Provisional Patent Application Ser. No. 60/944,853 filed Jun. 19, 2007, and claims the benefit of claims the benefit of U.S. Provisional Patent Application Ser. No. 61/354,909 filed Jun. 15, 2010 and U.S. Provisional Patent Application Ser. No. 61/474,643 filed Apr. 12, 2011. All of the above mentioned applications are incorporated by reference herein in their entireties.

BACKGROUND OF THE INVENTION

Field of the Invention

Embodiments of the present invention relate to systems and methods for personal viewing devices. More particularly, embodiments of the present invention relate to systems and methods for increasing the functionality and enhancing the connectivity of personal viewing devices, such as head mounted displays.

Background Information

Traditionally, a personal viewing device such as a head mounted display (HMD) has functioned like a computer monitor. A binocular HMD, for example, typically includes two eyepieces and a display control unit attached to a head mount. Each eyepiece includes a display controlled by the display control unit and each eyepiece also typically includes an optical system mounted in front of the display to make the image presented by the display appear larger and farther away. Sometimes, the image is created by a miniature projector that projects an image on a small screen. This screen is sometimes viewed through an optical system. A video image is created by an external image generating device, such as a computer or video player, and is sent to the device via a wired or wireless connection. The display control unit of the HMD then displays the video image to a user through each eyepiece.

In view of the foregoing, it can be appreciated that a substantial need exists for systems and methods that can enhance the connectivity and increase the functionality of HMDs.

Figure 1:
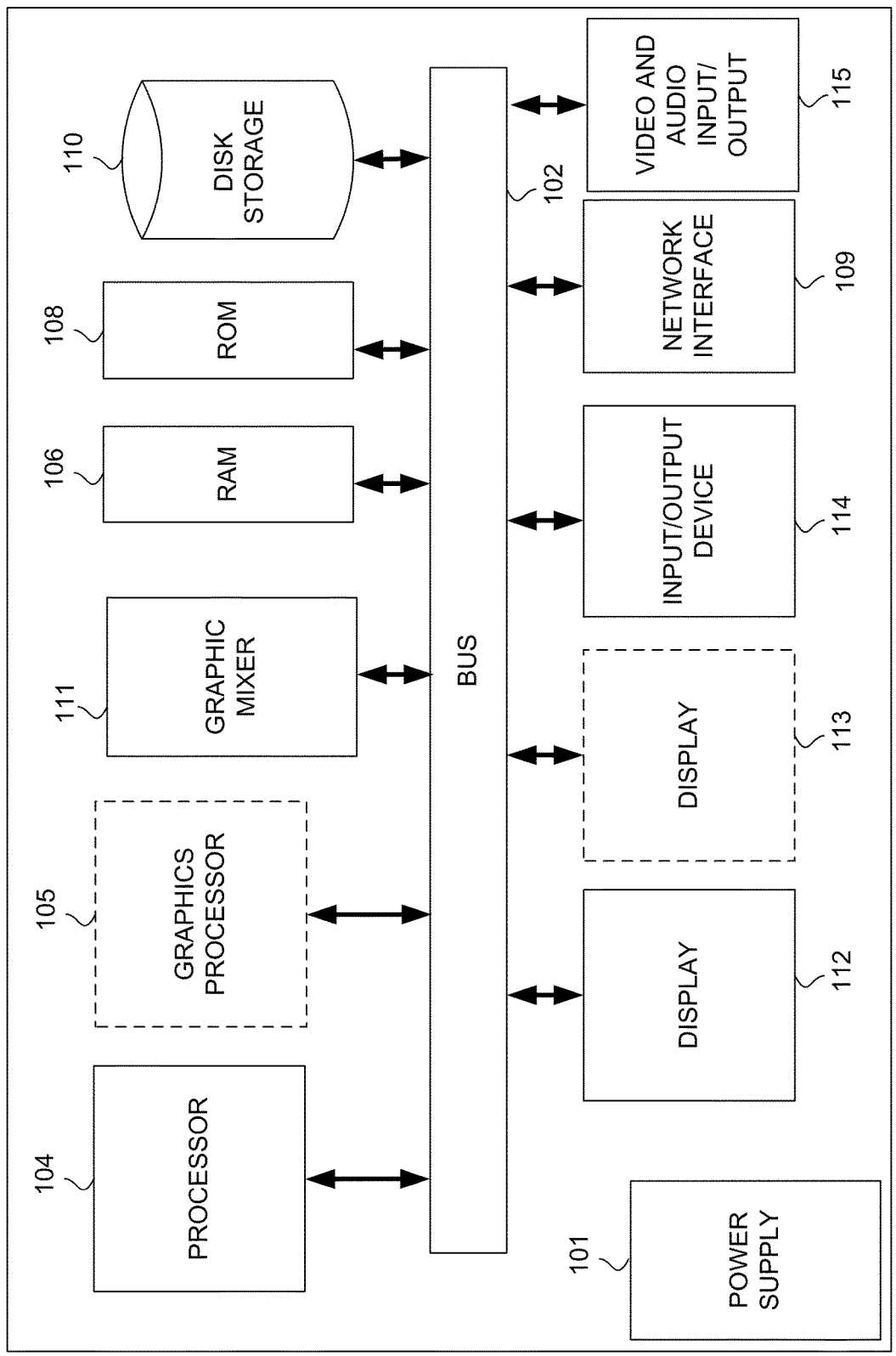
FIG. 1 is a block diagram that illustrates a computer system, in accordance with various embodiments.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, in accordance with various embodiments. The computer system 100 can be implemented on an electronic board or board set. The computer system 100 can also be implemented and integrated into a chip or chipset as is sometimes called "System on a Chip".

Computer system 100 includes a Power Supply 101 or another energy source mechanism for distributing and regulating power to the various components. The source of such power can be from an electrical outlet as well as from a battery. The Power Supply 101 converts and regulates the power to power levels desired by the various components. Computer system 100 also includes a bus 102 or other communication mechanism for communicating information such as data or video between the various components, and a processor 104 coupled with bus 102 for processing information. Computer system 100 might also include a graphics processor 105 that assists processor 104 with generating graphics, text, or images as well as performing various image transformations. For instance, the graphics processor can perform geometrical transformations of the image to compensate for any optical distortion caused by the viewing system of the personal display device. Computer system 100 also includes a memory 106, which can be a random access memory (RAM) or other dynamic storage device, coupled to bus 102 for determining base calls, and instructions to be executed by processor 104 and by graphics processor 105. Memory 106 also may be used for storing temporary variables, images or other intermediate information during execution of instructions to be executed by processor 104 and by graphics processor 105. Computer system 100 further includes a read only memory (ROM) 108 or other static storage device coupled to bus 102 for storing static information, videos, graphics, sounds, and instructions for processor 104 and graphics processor 105. A storage device 110, such as a magnetic disk or optical disk, is provided and coupled to bus 102 for storing information, videos, graphics, sounds and instructions.

Computer system 100 may be coupled via bus 102 to a display 112, such as a liquid crystal display (LCD), an organic light emitting diode display (OLED), or a miniature projector ("pico projector") of a personal viewing device, for displaying information to a user. Computer system 100 might include additional displays such as display 113 which might be used to provide different images to each eye to provide a stereoscopic 3D effect. Display 113 might also be used in combination with Display 112 to provide a higher-resolution image to the eye. An input/output device 114, is coupled to bus 102 for communicating information and command selections to and from processor 104 and graphics processor 105. Input/output device 114 can include, but is not limited to, a camera or a set of cameras, an eye tracker, a head tracker, a position tracker, a headphone set, a microphone, a global positioning satellite (GPS) device, a motion sensor, a glove, a communications device, a pointing device, an external memory, various indicators, or a selection device. Computer System 100 may also include network interface 109 that can connect computer system 100 with other computes, networks, the Internet, storage devices via communications links such as WiFi, Bluetooth, cellular networks such as 3G or 4G, wired connections and more.

A computer system 100 can perform the present teachings. Consistent with certain implementations of the present teachings, results are provided by computer system 100 in response to processor 104 and graphics processor 105 executing one or more sequences of one or more instructions contained in memory 106 or read only memory 108. Such instructions may be read into memory 106 from another computer-readable medium, such as storage device 110 or read only memory 108. Execution of the sequences of instructions contained in memory 106 causes processor 104 and graphics processor 105 to perform the process described herein. Alternatively hard-wired circuitry may be used in place of or in combination with software instructions to implement the present teachings. Thus implementations of the present teachings are not limited to any specific combination of hardware circuitry and software.

The computer system 100 may include a video and audio input/output 115 that allows computer system 100 to accept external video or audio sources such as from cameras. Video and audio input/output 115 also allows computer system 100 to generate video or audio sources for outside use, such as to present on an external monitor or to project on a wall or other reflective surface using a pico-projector and to be experienced with headphones or to be transmitted over a wireless network. The Computer System 100 may include a Graphic Mixer 111 that could combine or overlay one more images, videos or graphics with another. For instance, it could combine video signal coming from a camera connected to input/output device 114 with graphics generated by processor 104 or graphics processor 105. Graphics mixer 111 could also scale, move or otherwise transform an image, video or graphic prior to such combination. For instance, it could create a "picture in picture" showing a reduced version of video coming from a camera on top of the graphics generated by processor 104 or graphics processor 105. For instance, it could create an "augmented reality" by showing annotating symbols over a live camera image.

The term "computer-readable medium" as used herein refers to any media that participates in providing instructions to processor 104 and graphics processor 105 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a memory card, a memory stick, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 and graphics processor 105 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 and graphics processor 105 retrieves and executes the instructions. The instructions received by memory 106 may optionally be stored on storage device 110 or memory 106 either before or after execution by processor 104.

In accordance with various embodiments, instructions configured to be executed by a processor to perform a method are stored on a computer-readable medium. The computer computer-readable medium is a non-transitory computer computer-readable medium. The computer-readable medium can be a device that stores digital information. For example, a computer-readable medium includes a compact disc read-only memory (CD-ROM) or a memory card or stick as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Personal Viewing Device

A personal viewing device is a device for displaying information to one or both eyes through a lens. The lens is used so the personal viewing device can be located in front of and near the one or both eyes. The lens can be used to focus the image from a display directly on an eye or the lens can be a lens of a pico-projector that focuses the image on a reflective surface so that it is visible to the eye. A personal viewing device can include, but is not limited to, a monocular or binocular head mounted display (HMD), an augmented reality device, virtual reality glasses, a scope simulator, a monocular simulator, a binoculars simulator, or a telescope simulator. A scope simulator, for example, is essentially a monocular version of a personal viewing device that is mounted on a gun rather than a head. A personal viewing device can include monocular or binocular displays positioned in front of one or both eyes. One or more displays of a personal viewing device have been driven by an external image generating device, such as a computer or video player through a wired or wireless connection. A personal viewing device may also be coupled to eyeglasses or sunglasses.

A personal viewing device can be configured in number of ways. One configuration is the fully immersive configuration. In this configuration, the user only sees data that is generated for the personal viewing device. This data can be displayed on the displays of the personal viewing device or outside of the personal viewing device.

Another configuration is the optical see-through configuration. In this configuration, the personal viewing device includes a see-through glass or plastic lens and perhaps an optical mirror or other reflective optical element. Graphics are overlaid on the see-through glass or plastic lens. The personal viewing device essentially acts like a heads-up display.

Another configuration is the video see-through configuration. In this configuration, one or more cameras are mounted on the personal viewing device or near the personal viewing device. A video signal from the one or more cameras is then presented inside the personal viewing device together with other information producing what is sometimes referred to as "mixed reality." In a mixed reality environment, information generated and seen inside the personal viewing device is mixed with information obtained outside of the personal viewing device to create one combined virtual environment.

Systems and Methods of Data Processing

As described above, personal viewing devices, such as a head mounted display (HMD), have traditionally functioned like a computer monitor. They have displayed video or computer generated images to one or both eyes of a user. Personal viewing devices have also provided a limited interactive experience for a user. This interactive experience has included information from indirect input devices such as head trackers and eye trackers and direct input devices, such as keyboards, joysticks, and pointing devices, for example. Traditionally also, feedback from these input devices was processed by a computer connected to the personal viewing device.

In various embodiments, systems and methods are provided that transform a personal viewing device from a computer peripheral to an interactive standalone device.

Onscreen Display System

In various embodiments, a personal viewing device provides onscreen overlaid information to a display of an eyepiece of the personal viewing device. Such a personal viewing device includes an electronic board that combines the image being provided for display to the personal viewing device ("input image") with a graphic image of symbols, letters or drawings in such a way that the graphic image is combined with the input image. The graphic image can be displayed on one eye or both eyes. Different images may be displayed on each eye. The specific logic of the combination can be fixed or can be defined by a control interface. For instance, the logic can define that in those areas that the graphic image is not black, the input image will be replaced by the content of the graphic image.

Figure 2:
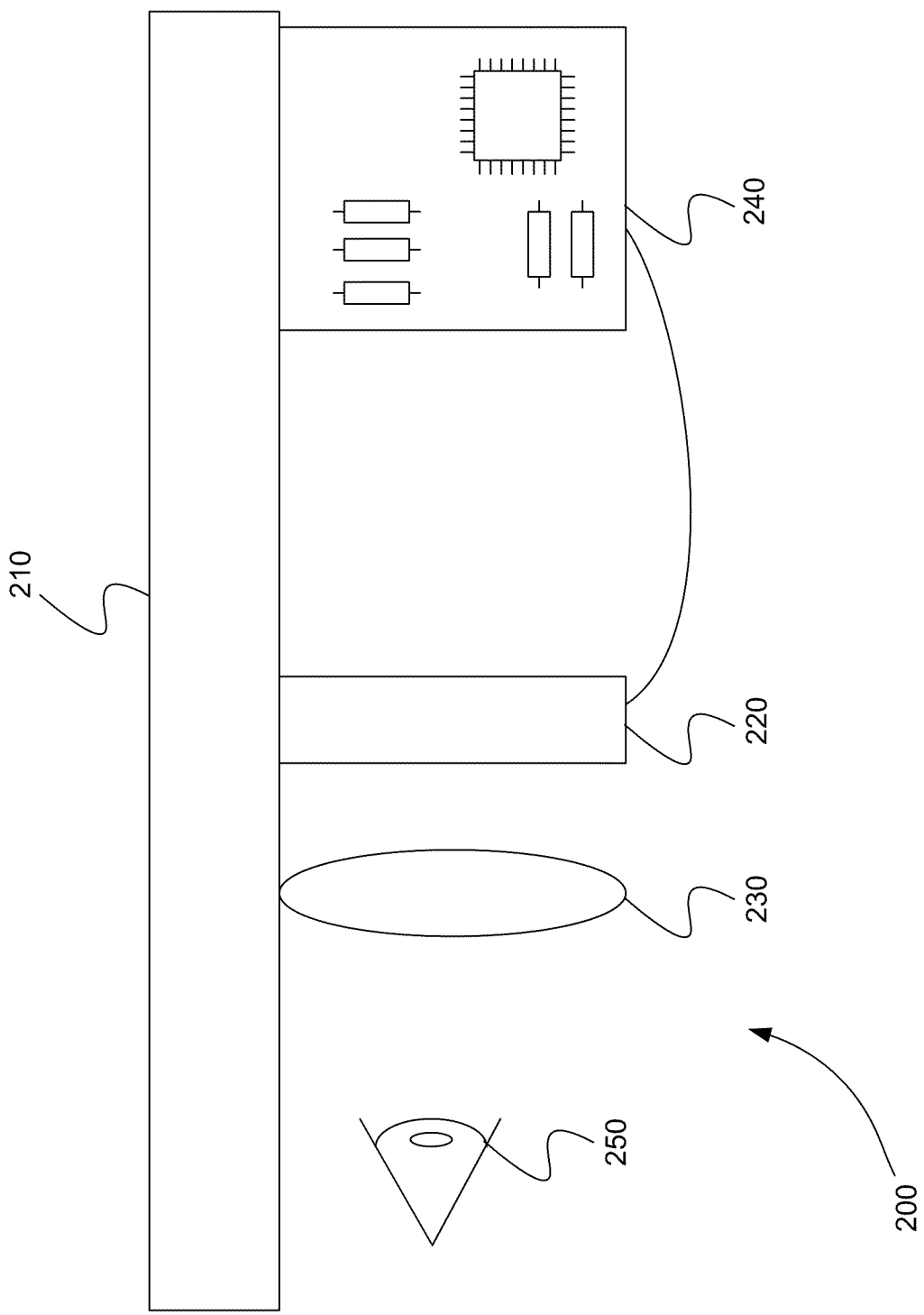
FIG. 2 is a schematic diagram of a personal viewing device for overlaying images, in accordance with various embodiments.

FIG. 2 is a schematic diagram of a personal viewing device 200 for overlaying images, in accordance with various embodiments. Personal viewing device 200 includes mount 210, electronic display 220, lens 230, and electronic circuit 240. Electronic display 220 and lens 230 are physically attached to mount 210. Electronic display 220 and lens 230 are positioned by mount 210 so that eye 250 views electronic display 220 through the lens 230. Mount 210 is a head mount, for example. In various embodiments, mount 210 is scope mount of a scope simulator, a monocular mount of monocular simulator, a binoculars mount of binoculars simulator, or a telescope mount of a telescope simulator.

In FIG. 2, lens 230 focuses an image from electronic display 220 directly on eye 250. In various embodiments, lens 230 and electronic display 220 can be part of a pico-projector that focus image directly on eye 250 or indirectly on eye 250 through a reflective surface (not shown).

Electronic circuit 240 is also physically attached to personal viewing device 200. Electronic circuit 240 overlays a first image with a second image to produce an overlaid image. Electronic circuit 240 is electrically connected to electronic display 220. Electronic circuit 240 displays the overlaid image on electronic display 220. The first image includes an input image, for example. The second image includes a graphic image of symbols, letters, or drawings, for example.

Figure 3:
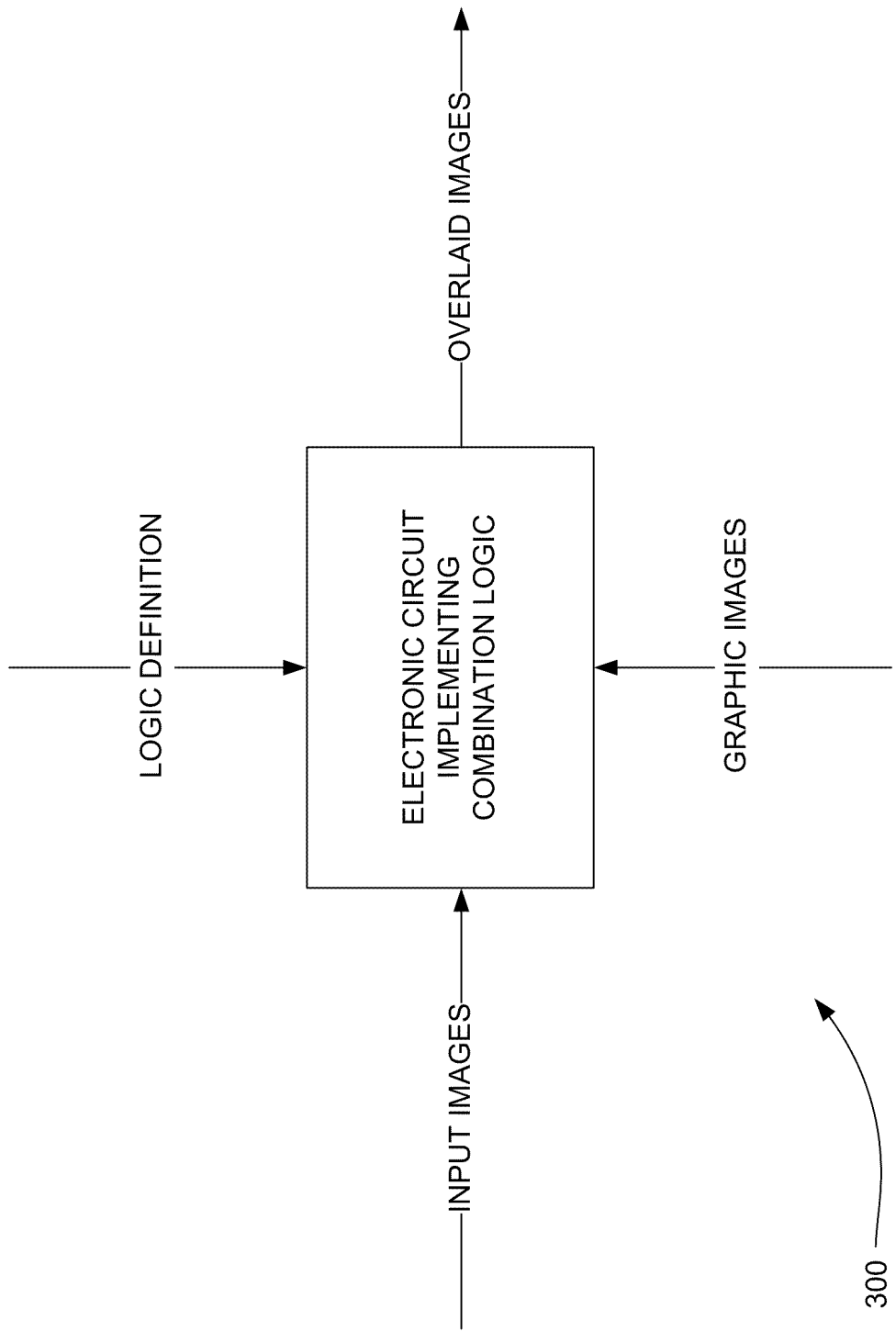
FIG. 3 is a schematic diagram of a logical view of an electronic circuit that combines an image being provided for display to a personal viewing device with an overlapping onscreen image, in accordance with various embodiments.

FIG. 3 is a schematic diagram of a logical view of an electronic circuit 300 that combines an image being provided for display to a personal viewing device with an overlapping onscreen image, in accordance with various embodiments.

Personal Viewing Device Onscreen Status Display Method

Returning to FIG. 2, in various embodiments the second image that electronic circuit 240 overlays onto the first image includes status information of the personal viewing device. Status information can include, for example, an indication of the battery life remaining or the heading in which the user's head is oriented. A method of displaying onscreen status information on personal viewing device 200 can include a number of steps. In a first step, the information to be displayed is determined by analyzing sensors (not shown) inside personal viewing device 200, connected to personal viewing device 200 or inside its control electronics, such as battery level or incoming resolution of a video signal. The information to be displayed can also be generated and determined by a computer connected to the personal viewing device via various communication mechanisms such as USB, Ethernet, Bluetooth, or wireless networks. In a second step, the graphics or text to be displayed on personal viewing device 200 is created. In a third step, the graphics or text is displayed on personal viewing device 200.

Personal Viewing Device Onscreen Content Display Method

In various embodiments, the second image that electronic circuit 240 overlays on the first image includes onscreen content such as an advertisement This onscreen content can include a text or graphical overlay.

In various embodiments, personal viewing device 200 can include an input device (not shown) that can be triggered in response to onscreen content displayed on personal viewing device 200. For example, the onscreen content displayed on personal viewing device 200 can include an offer to purchase a game similar to a game currently being viewed in personal viewing device 200. A microphone, keyboard, mouse, or joystick can then be used as the input device that can trigger a connection to a call center, a connection to a website, more information, or the execution of a purchase, for example.

In various embodiments, the onscreen content displayed on personal viewing device 200 may or may not originate from an image generator of personal viewing device 200. For example, if a personal viewing device is being driven by digital versatile disk (DVD) player, the DVD being played could include both the images displayed in personal viewing device 200 and the advertising shown on part of the images as onscreen content. Alternatively, the DVD being played may not include advertising and the onscreen content is driven by source other than the DVD player such as the GPS sensor.

In various embodiments, the onscreen content can be stereoscopic. In various embodiments, the onscreen content can be related to head motion based on a head tracking device in personal viewing device 200. In various embodiments, the onscreen content can be related to the position of a user's eyes based on an eye tracking device in personal viewing device 200. In various embodiments, the onscreen content can be related to the position, orientation, movement or acceleration of a user's limbs, fingers or other body parts based on a camera or cameras installed with personal viewing device 200 and analyzed by personal viewing device. In various embodiments, the onscreen content can be related to the position, orientation, movement or acceleration of objects worn by or held by the user based on a camera or cameras installed with personal viewing device 200 and analyzed by personal viewing device.

Wireless Personal Viewing Device

Traditionally, personal viewing devices have been used to view high bandwidth video signals. In addition, the space available on a personal viewing device for additional electronics has been limited by size and weight constraints. As a result, personal viewing devices have generally included a wired connection to image generating sources.

In various embodiments, personal viewing device 200 includes a wireless transceiver (not shown) to send and receive video images or onscreen content wirelessly. The wireless transceiver can be physically attached to mount 210, for example. The wireless transceiver can be added to a bi-ocular or binocular personal viewing device, for example. The wireless transceiver of personal viewing device 200 can receive or send signals to one or more image generating transceivers. In various embodiments, the wireless transceiver can also be used to transmit video or telemetry data from personal viewing device 200 to another transceiver. In various embodiments, this video can originate from video cameras (not shown) installed on or inside personal viewing device 200. In various embodiments, this video can originate from memory or storage devices installed on or inside personal viewing device 200.

Communication Between Personal Viewing Devices

In various embodiments, personal viewing device 200 includes a wireless transceiver that is in communication with another wireless transceiver of another personal viewing device. Wireless communication between personal viewing devices allows networking of personal viewing devices. Such networking can be used, for example, for communicating between two or more personal viewing devices in a multiplayer game, for example Interactive Mobile Device Connectivity Method The increase in the computing power of mobile devices including, but limited not to, cell phones, music players, digital cameras, and game players has increased the interactive capability of these devices and opened new areas of interactivity, such as global positioning.

In various embodiments, personal viewing device 200 receives video images from a mobile device (not shown) and sends at least one interactive command to the mobile device that affects subsequent video images received. An example of such interactive command can be a report of position and orientation sensed by the personal viewing device, or the status of a button pressed on the personal viewing device. Personal viewing device 200 is in communication with the mobile device using a wireless transceiver, for example.

Standalone Personal Viewing Device

As described above, personal viewing devices have traditionally been tethered or wired to an image generating device such as a computer or DVD player. This is largely due to the high video bandwidth requirement and size and weight limitations of personal viewing devices, as also described above.

In various embodiments, personal viewing device 200 includes an image generating device attached to mount 210. Electronic circuit 240 can include the image generating device or the image generating device can be a separate device. The image generating can include a video player, for example. The image generating device reads data from an internal memory or external memory, such as a memory card, generates a video signal from the data, and displays the video signal to a user without connection to any other devices, for example.

Onboard Processor

In various embodiments, an image generating device attached to mount 210 of personal viewing device 200 can be an embedded or onboard processor or computer system as shown in FIG. 1. An onboard processor is, for example, a processor that is housing in the same enclosure as personal viewing device 200. The enclosure of a personal viewing device includes mount 210, for example. This processor can operate in a number of different modes. For example, the processor can simply pass through an external video signal to electronic display 220 of personal viewing device 200. In this mode, the personal viewing device still acts like a computer monitor.

In another mode, the processor can execute an application inside personal viewing device 200 and generate its own video signal. The application can be a game, a business application, or a combination of both, for example. The application can be downloaded from the Internet using a wired or wireless connection, for example. The application can be part of an online marketplace for applications for personal viewing devices, for example.

In another mode, the processor can generate the second image used by electronic circuit 240. For example, the video signal from an external source can be replaced, modified, or overlaid with graphics, symbols, or video that is generated by the processor of personal viewing device. In yet another mode, electronic circuit 240 includes the onboard processor and the onboard processor performs the overlaying function.

In another mode, the processor can analyze images from a camera or cameras attached to the viewing device. The processor can, for instance, identify targets and present this identification for the user. The processor can, for instance, enhance the image received from the camera so as to improve the visibility, to improve the contrast or highlight specific areas of the image, for instance. The processor can, for instance, use camera or cameras attached to viewing device 200 to determine the location, orientation, speed, and acceleration of the user, or to determine the location, orientation, speed and acceleration or various body parts of the user or of other visible objects.

In various embodiments, including an onboard processor in personal viewing device 200 allows applications to be written that provide communication between two or more personal viewing devices. This communication can be wired or wireless. Wireless communication can include, but is not limited to, Wi-Fi, Bluetooth, 3G, or 4G communication. Communications can be in 'peer to peer' mode or can be routed through a central hub, server or communications gateway. Applications that provide communication between two or more personal viewing devices can include a multiplayer game, for example.

Previously, when a personal viewing device acted like a computer monitor, communication between players in a multiplayer game would happen, for example, in a central computer or between computers on a network. Essentially, the communication was outside of the personal viewing devices. In contrast, placing the processor onboard personal viewing devices allows interaction directly between the personal viewing devices.

Modular Peripherals

In various embodiments, personal viewing device 200 further includes an input/output interface (not shown). The input/output interface is used to connect one or more personal viewing device peripheral devices to personal viewing device 200. The input/output interface can further connect the one or more personal viewing device peripheral devices to an onboard processor.

The input/output interface allows one or more personal viewing device peripherals to be added to personal viewing device 200 as modules with a common interface. A personal viewing device peripheral can include, but is not limited to, a camera, an eyetracker, a head tracker, a microphone, a global positioning satellite (GPS) device, a motion sensor, a glove, a communications device, a pointing device, an external memory, or a selection device, a speaker, a light sensor or light source. A common interface can include, but is not limited to, universal serial bus (USB), the IEEE 1394 interface (firewire), Bluetooth, Zigbee, high-definition multimedia interface (HMDI), secure digital (SD), or micro SD.

A common interface allows many different types of personal viewing device peripherals to be connected to personal viewing device 200 using the same port. An onboard processor of personal viewing device 200 can allow a personal viewing device peripheral to be recognized and configured as soon as it is attached to personal viewing device 200. For example, a GPS device can be attached to a port of personal viewing device 200. As soon as the GPS device is attached, the onboard computer recognizes it, configures it, and makes it available to applications for use inside personal viewing device 200. Data from such as device, such as a GPS device, may be available in a common format so that the applications do not need to be concerned which specific GPS is connected and the personal viewing device 200 provides a uniform, standard interface for GPS devices to applications.

In various embodiments, the ports of personal viewing device 200 can be categorized based on bandwidth. For example, low-volume devices such as pointing devices can be attached to low-volume ports. Similarly, high-volume devices such as cameras can be attached to high-volume ports.

In various embodiments, personal viewing device 200 can also have multiple power sources. For example, personal viewing device 200 can include a battery that is attached to mount 210. The battery can be replaceable or non-replaceable. In various embodiments, the battery is rechargeable. In alternative embodiments, personal viewing device 200 can receive power through a wired or magnetically coupled connection.

Mixed Reality

In various embodiments, personal viewing device 200 includes one or more cameras (not shown) attached to mount 210. The second image includes an image from the one or more cameras. Electronic circuit 240, then overlays the image from the one or more cameras onto the input image providing a mixed reality overlaid image. In mixed reality, information generated and seen inside a personal viewing device is mixed with information obtained outside of the personal viewing device to create one combined virtual environment.

In various embodiments, placing a processor inside personal viewing device 200 can improve the functionality of mixed reality. The onboard processor can read the one or more cameras and process this information to identify people, for example. The onboard processor can also be used to calculate the position and orientation of personal viewing device 200 relative to other objects in the room and use this information in a variety of ways such as to enhance the gaming experience, or to warn of imminent collisions with physical objects. The processor can also add virtual objects or otherwise modify the image based on software that is running on personal viewing device 200.

In various embodiments, an onboard processor can also increase the functionality of mixed reality in an optical see-through configuration. In this configuration, the user can see a real scene through the glass or plastic lens of personal viewing device 200. The onboard processor of personal viewing device 200 can then use the information from the one or more cameras to identify targets, enhance the image, or add annotations to the image based on what the processor determines from the video signal of the one or more cameras.

In various embodiments, one or more cameras on personal viewing device 200 or near the personal viewing device 200 can be used to provide interaction with a user. For example, the one or more cameras can be focused on the user's fingers, hands, or body. As a result, the onboard processor of personal viewing device 200 can interpret the video signal from the one or more cameras to determine gestures made by the user. By recognizing fingers, for example, the onboard processor of personal viewing device 200 can create a virtual touch screen in free space. Gestures recognized by the onboard processor of personal viewing device 200 from the fingers, hands, or body of the user can be used to drive a videogame, drive a user interface, or manipulate images inside personal viewing device 200, for example.

Automatic Video Input Detection Method

In various embodiments and as above, personal viewing device 200 includes a second electronic display (not shown) attached to mount 210 and a second lens (not shown) attached to mount 210. The second lens is positioned by mount 210 so that a second eye (not shown) views the second electronic display through the second lens. Electronic circuit 240 samples the first image received to determine if the first image is monoscopic or stereoscopic. Electronic circuit 240 displays the same image on electronic display 220 and the second electronic display if the first image is monoscopic. Electronic circuit 240 displays different images on electronic display 220 and the second electronic display if the first image is stereoscopic.

Binocular personal viewing devices can be built to accept monoscopic or stereoscopic inputs. A personal viewing device can take a single video input signal and display the same image from the input signal on each of the two displays of the personal viewing device, or a personal viewing device can take two separate video input signals and display two separate images of the same scene on the two separate displays of the personal viewing device. Traditionally, a personal viewing device has not been able to determine whether the video input is monoscopic or stereoscopic and automatically reconfigure itself.

In various embodiments, a video signal received by a binocular personal viewing device is sampled, it is determined whether or not the video signal is monoscopic or stereoscopic, and the personal viewing device automatically configures the images sent to its displays for monoscopic or stereoscopic viewing. This can involve a number of steps. In a first step, the resolution of the incoming video signal is detected. In a second step, this detected resolution is compared to the available resolutions of the display of each eye of the personal viewing device. Also, the aspect ratio of the incoming signal relative to the aspect ratio provided by each eye of the personal viewing device is compared. In a third step, based on these comparisons, it is determined if the best mode is bi-ocular or binocular.

The type of video signal received by a binocular personal viewing device can be automatically determined using hardware, software, or any combination of the two. The hardware used to perform the automatic video input detection method and/or the hardware used to execute software that performs the automatic video input detection method can be located in the personal viewing device or in a device connected to the personal viewing device.

Controller Area Network (CAN) Connectivity Method

Motor vehicles are increasingly including more electronic components and more computing power. As a result, it is becoming more and more important to be able connect devices to motor vehicle systems for a variety of purposes including but not limited to maintenance, entertainment, and communication. Connecting a personal viewing device to a motor vehicle can be particularly advantageous for maintenance and entertainment purposes for example. Unfortunately, motor vehicles have traditionally transferred data using standards developed for the motor vehicle industry. One standard developed for the motor vehicle industry is the controller area network (CAN) bus standard.

In various embodiments, electronic circuit 220 of personal viewing device 200 receives the first image or the second image from a motor vehicle system and the first image or the second image includes the CAN standard. Electronic circuit 220 can also send images using the CAN standard. In various embodiments, the CAN standard can be used for connectivity between a personal viewing device and a motor vehicle system or between a personal viewing device and other devices that implement the CAN standard.

Online Marketplace for Applications

In various embodiments, personal viewing device 200 includes an onboard processor that receives and executes an application from an online marketplace for personal viewing device applications.

Figure 4:
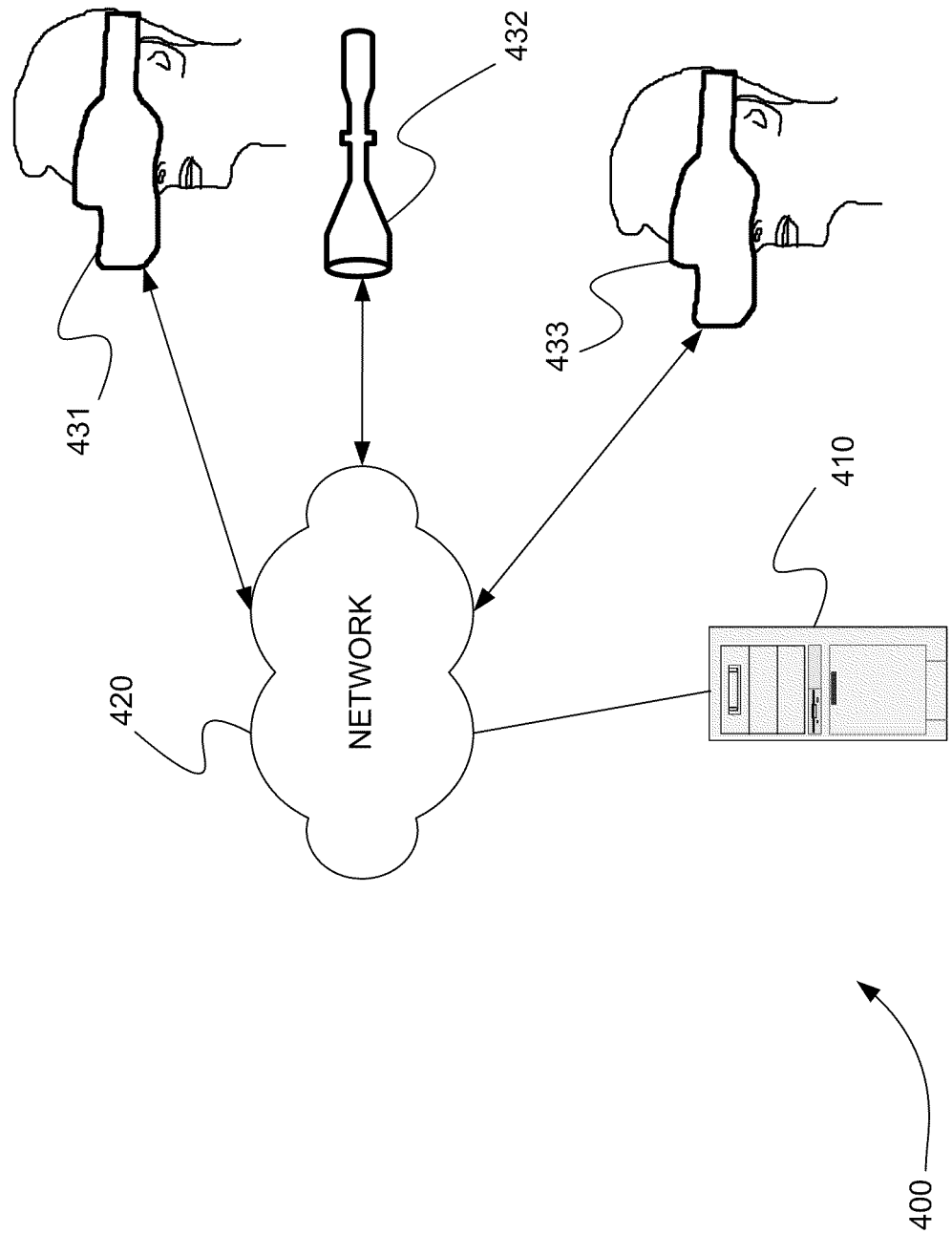
FIG. 4 is an exemplary schematic diagram of a system for providing an online marketplace for applications that can be executed by an onboard processor of the one or more personal viewing devices, in accordance with various embodiments.

FIG. 4 is an exemplary schematic diagram of a system 400 for providing an online marketplace for applications that can be executed by an onboard processor of the one or more personal viewing devices, in accordance with various embodiments. System 400 includes server computer 410, network 420, and personal viewing devices 431, 432, and 433. Network 420 is, for example, the Internet. Personal viewing devices 431 and 433 are head mounted displays (personal viewing devices) and personal viewing device 432 is a scope simulator, for example. The communication between server computer 410 and personal viewing devices 431, 432, and 433 can be wired or wireless. Applications that can be executed by an onboard processor of personal viewing devices 431, 432, or 433 can be downloaded from or uploaded to server computer 410 using the network 420.

Applications

Returning to FIG. 2, personal viewing device 200 includes an onboard processor that executes an application that allows the personal viewing device to be used for eye testing. Including an onboard processor in a personal viewing device increases the functionality of personal viewing device applications. For example, the portability of an eye testing application is significantly improved if the image generation, patient response, and test result calculation functions are handle by a processor onboard the personal viewing device. An eye testing application can include, but is not limited to, a distance and near vision test, a glare test, a strabismus test, a neurological test, a stereo test, a color test, a reaction test, or a visual field test. Performing all of the processing onboard a personal viewing device allows an eye test to be performed in a hospital room, nursing home, in a patient's home, or an office waiting room, for example. There is no need for an external computer or power source. Patient feedback devices such as a button for recording patient responses can be directly connected to, monitored and controlled by, and powered by the personal viewing device. In another example, training applications that use personal viewing device often require an external computer as a data source, and this external computer either needs to be carried with the trainee or limits the movement of the trainee. By allowing the training application to execute directly on the personal viewing device, the need for an external computer is removed; the training can take place in a wider variety of places and requires significantly less equipment to conduct.

In another application, personal viewing device 200 includes an onboard processor that executes an application that allows the personal viewing device to be used for pain management and post-traumatic stress disorder treatment. Including an onboard processor in a personal viewing device increases the functionality of personal viewing device applications. For example, the portability of pain management applications is significantly improved if the image generation, patient response, and test result calculation functions are handle by a processor onboard the personal viewing device. A pain management application can include, but is not limited to, display of cold scenes for management of burn-related pain. Performing all of the processing onboard a personal viewing device allows a pain management of PTSD treatment application to be performed in a hospital room, nursing home, in a patient's home, or an office waiting room, for example. There is no need for an external computer or power source. Patient feedback devices such as a button for recording patient responses can be directly connected to, monitored and controlled by, and powered by the personal viewing device.

Adjustable Display Overlap

In various embodiments, personal viewing device 200 includes a second electronic display (not shown) attached to mount 210 and a second lens (not shown) attached to mount 210. The second lens is positioned by mount 210 so that a second eye (not shown) views the second electronic display through the second lens. Personal viewing device 200 further includes a mechanical adjustment device that allows the position of electronic display 220 and lens 230 to be manually adjusted relative to the position of the second electronic display and the second lens so that the amount of overlap of an image seen by eye 250 and the second eye is changed.

For example, a binocular personal viewing device includes one eyepiece for each eye. As described above, each eyepiece can include one or more displays with a matching lens or lenses located between the one or more displays and the eye. Generally, the eyepieces of binocular personal viewing devices are physically located relative to each other so that images displayed on the one or more displays for each eye completely overlap. In other words, the relative positions of the eyepieces allow each eye to see the same scene from the left eye and right eye perspective. As a result, is not possible to view widescreen images on such personal viewing devices.

In various embodiments, a mechanical adjustment device enables the relative positions of the eyepieces of a personal viewing device to be adjusted so that the amount of overlap of the image seen by each eye can be changed. Essentially, the apparatus enables the total field of view (FOV) of the personal viewing device to be increased by reducing the overlap between the eyes. Further, when a user adjusts the apparatus, the personal viewing device senses the adjustment and configures the images on the displays accordingly for amount of overlap allowed by the new relative positions of the eyepieces.

Figure 5:
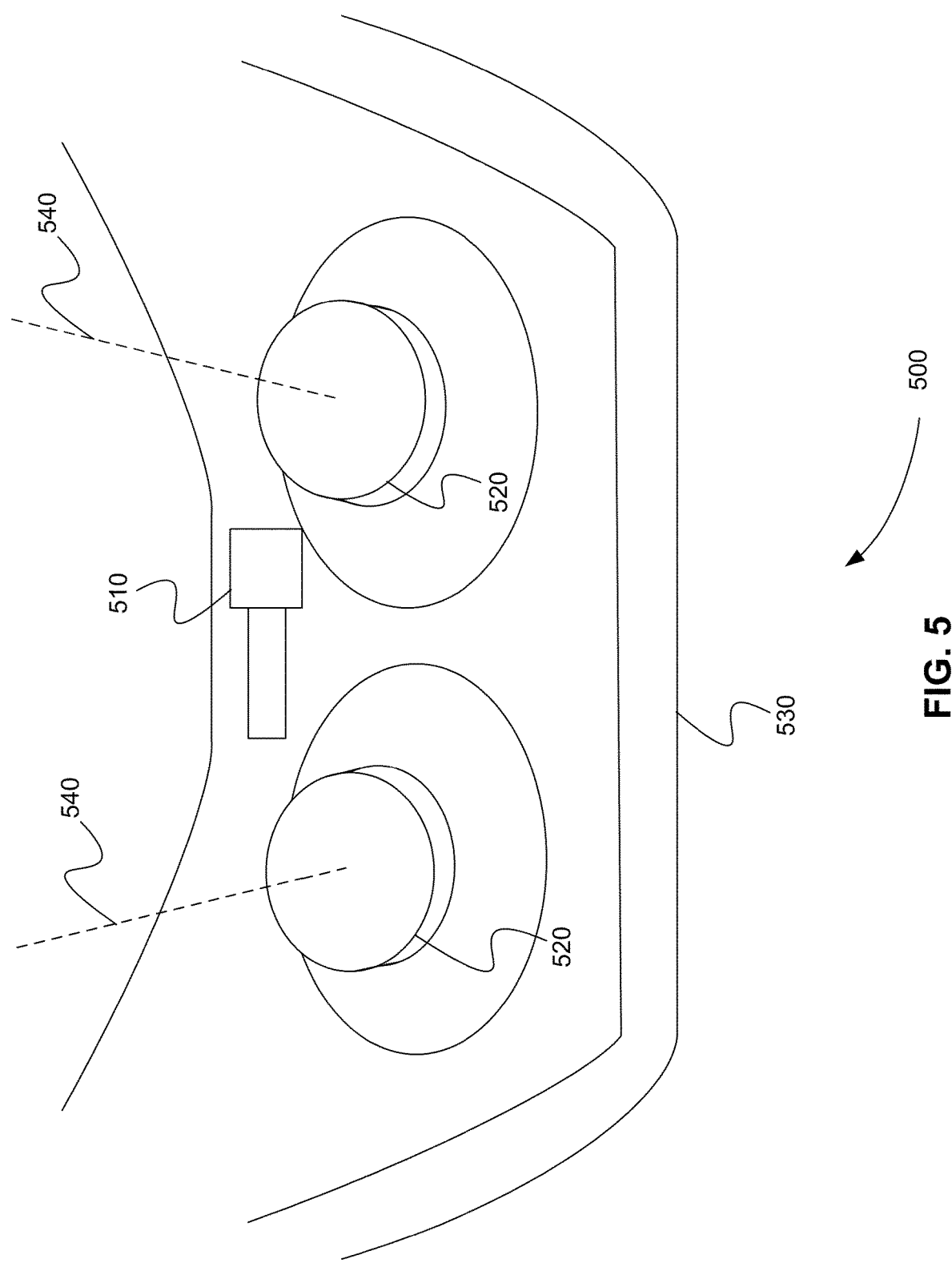
FIG. 5 is a schematic diagram of the inside of a personal viewing device 530 that shows a mechanical adjustment device positioned to increase the overlap seen through the eyepieces, in accordance with various embodiments.

FIG. 5 is a schematic diagram 500 of the inside of a personal viewing device 530 that shows a mechanical adjustment device 510 positioned to increase the overlap seen through the eyepieces 520, in accordance with various embodiments.

Figure 6:
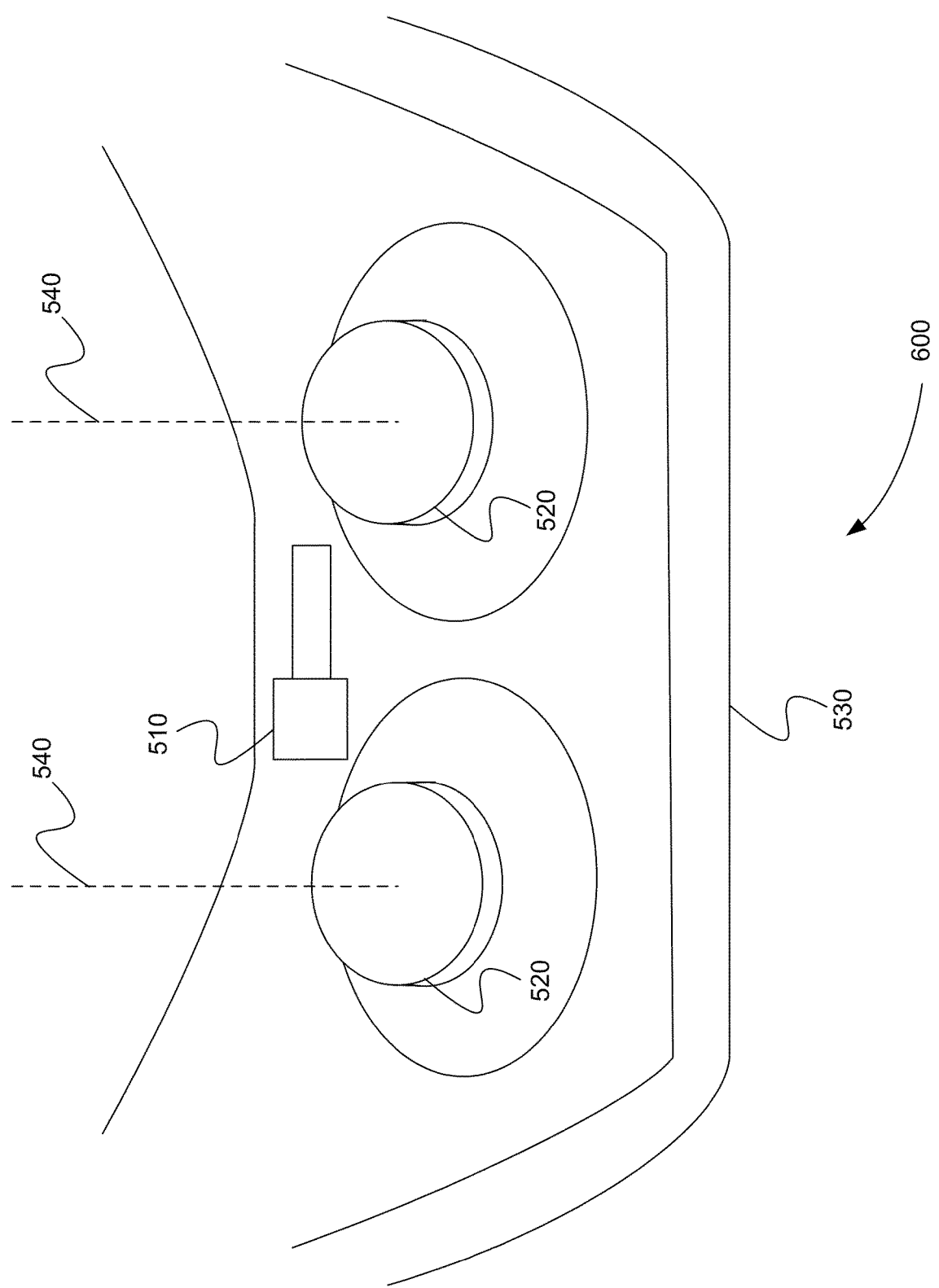
FIG. 6 is a schematic diagram of the inside of a personal viewing device that shows a mechanical adjustment device positioned to decrease the overlap seen through the eyepieces, in accordance with various embodiments.

FIG. 6 is a schematic diagram 600 of the inside of a personal viewing device 530 that shows a mechanical adjustment device 510 positioned to decrease the overlap seen through the eyepieces 520, in accordance with various embodiments.

Other than the position of mechanical adjustment device 510, a key difference between FIGS. 5 and 6 is that the relative rotation of eyepieces 520 changes. In FIG. 6, for example, the optical axes 540 (e.g. the imaginary lines that go through the center of the lens of each of eyepieces 520) are essentially parallel. In contrast, in FIG. 5 the optical axes 540 are not parallel.

Overlapping Display Method

Returning to FIG. 2, in various embodiments and as above personal viewing device 200 includes a second electronic display (not shown) attached to mount 210 and a second lens (not shown) attached to mount 210. The second lens is positioned by mount 210 so that a second eye (not shown) views the second electronic display through the second lens. The first image received by electronic circuit 240 includes a widescreen image. Electronic circuit 240 separates the first image into a first overlapping image for display on electronic display 220 and a second overlapping image for display on the second electronic display.

Traditionally, head mounted displays (personal viewing devices) have displayed images in one of two ways. First, a single video input signal has been used to display the same image of a scene on each of the two displays of a binocular personal viewing device. Essentially, the same image is shown at the same time to both eyes. This is a bi-ocular method of displaying images. Second, two video input signals have been used to display two different images of the same scene on the two displays of a binocular personal viewing device. This is a stereoscopic method of displaying images and results in a three-dimensional (3D) visual effect.

In various embodiments, a method is used to separate a single widescreen video input signal into two different overlapping images that are displayed stereoscopically on the two displays of a binocular personal viewing device. This method allows a wider image to be presented to a personal viewing device user and extends the overall field of view (FOV) that the user perceives.

For example, consider a binocular personal viewing device where the individual horizontal FOV of each eyepiece of the personal viewing device is 50 degrees. An eyepiece of a personal viewing device can include one or more displays and one or more lenses matched to the one or more displays, for example. If a single widescreen video input signal with a horizontal FOV of 60 degrees is sent to this personal viewing device, the personal viewing device can separate the 60 degree image into two partially overlapping 50 degree images and render each of the two 50 degree images to the eyepieces of the personal viewing device. A user of the personal viewing device can then see the overlapping 40 degrees of the 60 degree image with both eyes and the 10 degree edges of the 60 degree image only in either eye separately.

The single widescreen video input signal can be separated using hardware, software, or any combination of the two. The hardware used to perform the separation method and/or the hardware used to execute software that performs the separation method can be located in the personal viewing device or in a device connected to the personal viewing device.

In various embodiments, the method of separating a single widescreen video input signal into two different overlapping images involves calculating the projection of an overlapping image for each display of the personal viewing device. In other words, separating a single widescreen video input signal into two different overlapping images could involve more than just trimming an image for each display. It can involve a number of steps. In a first step, how the input signal projects onto each of the output eyes is calculated, while taking into account the individual field of view and geometric orientation of each eye. In a second step, a set of coefficients is created that allows real-time mapping of the source image into the output images. In a third step, a set of interpolation coefficients is created, if required, that allows re-sampling the input image into the output images while preserving image quality. In a fourth step, real-time mapping of input to output images is performed so that incoming video is immediately converted into outgoing images.

Multi-Surfaced Tiled Lenses

A tiled multiple display personal viewing device is described in U.S. Pat. No. 6,529,331 ("the '331 patent"), which is herein incorporated by reference in its entirety. The personal viewing device the '331 patent solved many of the problems of earlier personal viewing devices, while achieving both high visual resolution and a full field of view (FOV). The personal viewing device of the '331 patent used an optical system in which the video displays and corresponding lenses were positioned tangent to hemispheres with centers located at the centers of rotation of a user's eyes. Centering the optical system on the center of rotation of the eye was the principal feature of the personal viewing device of the '331 patent that allowed it to achieve both high fidelity visual resolution and a full FOV without compromising visual resolution.

The personal viewing device of the '331 patent used a simpler optical design than that used by earlier personal viewing devices. The personal viewing device of the '331 patent used an array of lens facets that were positioned tangent to the surface of a sphere. The center of the sphere was located at an approximation of the "center of rotation" of a user's eye. Although there is no true center of eye rotation, one can be approximated. Vertical eye movements rotate about a point approximately 12 mm posterior to the cornea and horizontal eye movements rotate about a point approximately 15 mm posterior to the cornea. Thus, the average center of rotation is 13.5 mm posterior to the cornea.

The personal viewing device of the '331 patent also used a multi-panel video wall design for the personal viewing device's video display. Each lens facet imaged a miniature single element display, which was positioned at optical infinity or was adjustably positioned relative to the lens facet. The single element displays were centered on the optical axes of the lens facets. They were also tangent to a second larger radius sphere with its center also located at the center of rotation of the eye. The personal viewing device of the '331 patent also included high resolution and accuracy head trackers and built-in eye trackers. One or more computers having a parallel graphics architecture drove the personal viewing device of the '331 patent and used data from these trackers to generate high detail three-dimensional (3D) models at high frame rates with minimal perceptible lag. This architecture also optimized resolution for central vision with a roaming high level of detail window and eliminated slip artifacts associated with rapid head movements using freeze-frame. The result was a head-mounted display that rendered virtual environments with high enough fidelity to produce correct feelings of space and mass, and which did not induce simulator sickness.

Figure 7:
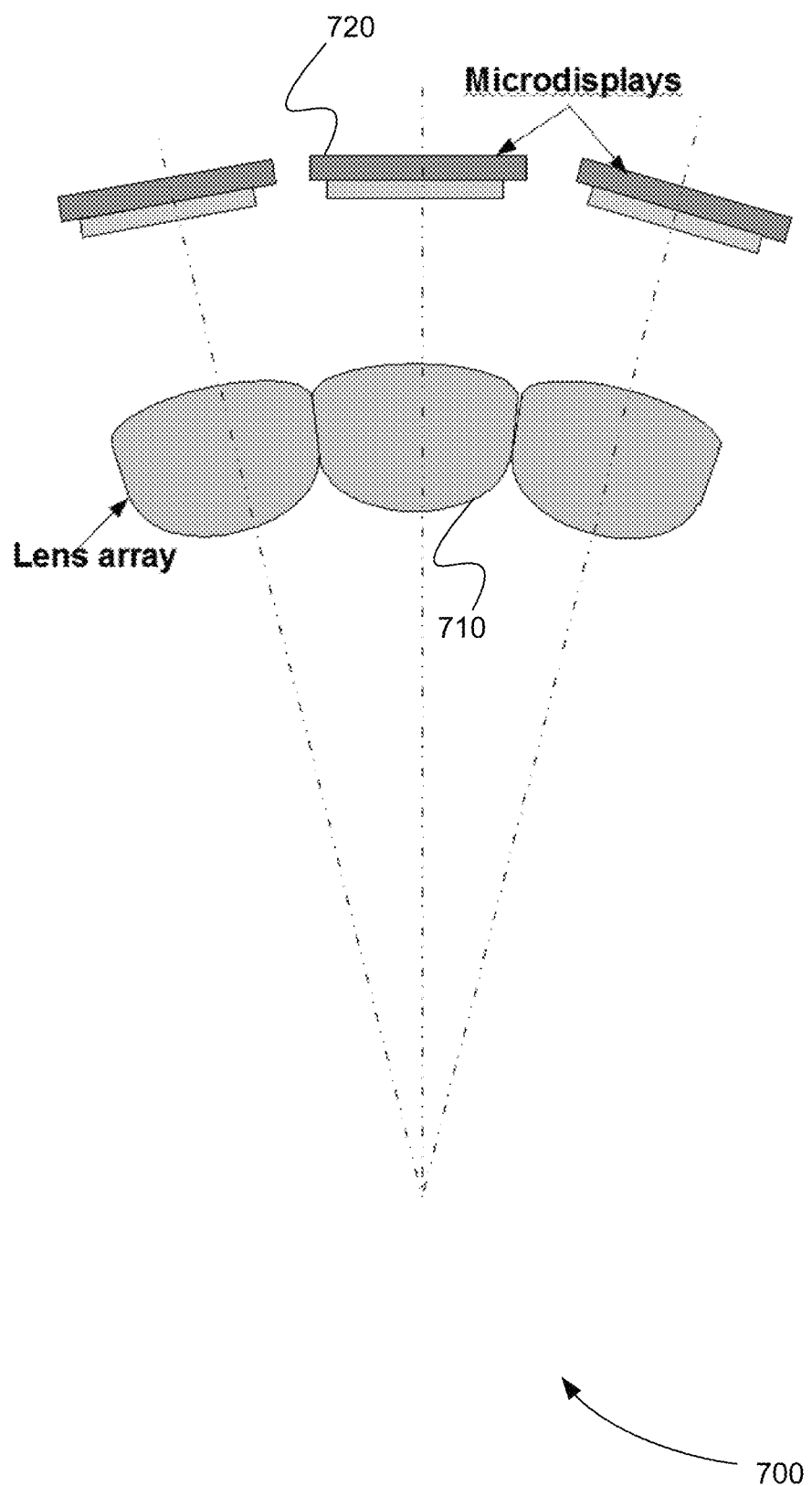
FIG. 7 is schematic diagram of a tiled eyepiece of a personal viewing device that includes optical lenses made of a single material matched to two or more displays, in accordance with various embodiments.

FIG. 7 is schematic diagram of a tiled eyepiece 700 of a personal viewing device that includes optical lenses 710 made of a single material matched to two or more displays 720, in accordance with various embodiments. A tiled personal viewing device eyepiece includes two or more tiled displays and two or more tiled optical lenses matched to the two or more displays. The displays and lenses are tiled to increase the field of view and produce the effect of a curved surface. Because tiled optical lenses of a tiled personal viewing device had irregular shapes and were molded separately and glued together, they were traditionally made of a single material.

Figure 8:
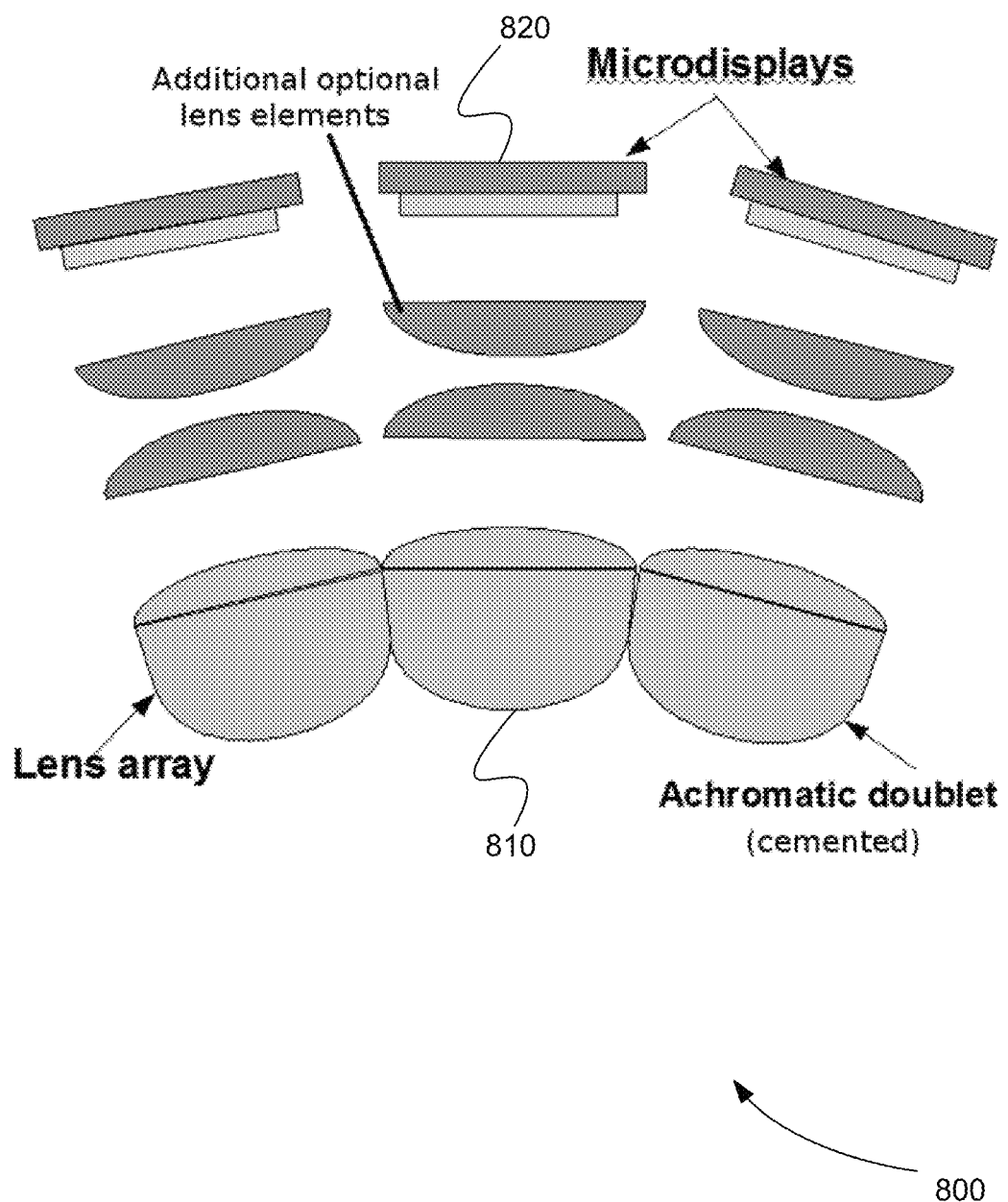
FIG. 8 is schematic diagram of a tiled eyepiece of a personal viewing device that includes optical lenses made of a multiple materials with multiple surfaces matched to two or more displays, in accordance with various embodiments.

FIG. 8 is schematic diagram of a tiled eyepiece 800 of a personal viewing device that includes optical lenses 810 made of a multiple materials with multiple surfaces matched to two or more displays 820, in accordance with various embodiments. Using multiple materials with multiple surfaces in tiled lenses can improve the optical characteristics, such as resolution, distortion, and color properties of the lenses. In various embodiments, a tiled optical lens of a tiled personal viewing device includes two or more materials producing three or more optical surfaces. A tiled lens for tiled personal viewing device includes a first semi-curved lens and a second semi-curved lens. The first semi-curved lens includes two or more molded lenses of a first material. The second semi-curved lens includes two or more molded lenses of a second material. The second semi-curved lens is bonded to the first semi-curved lens.

Multi-Surfaced Tiled Lens Manufacturing Method

As described above, tiled lenses are not traditionally made of more than one material and do not include more than two surfaces. This is because each tiled lens was traditionally molded separately and then glued together with other lenses. Using multiple materials increases the complexity of this process.

Figure 9:
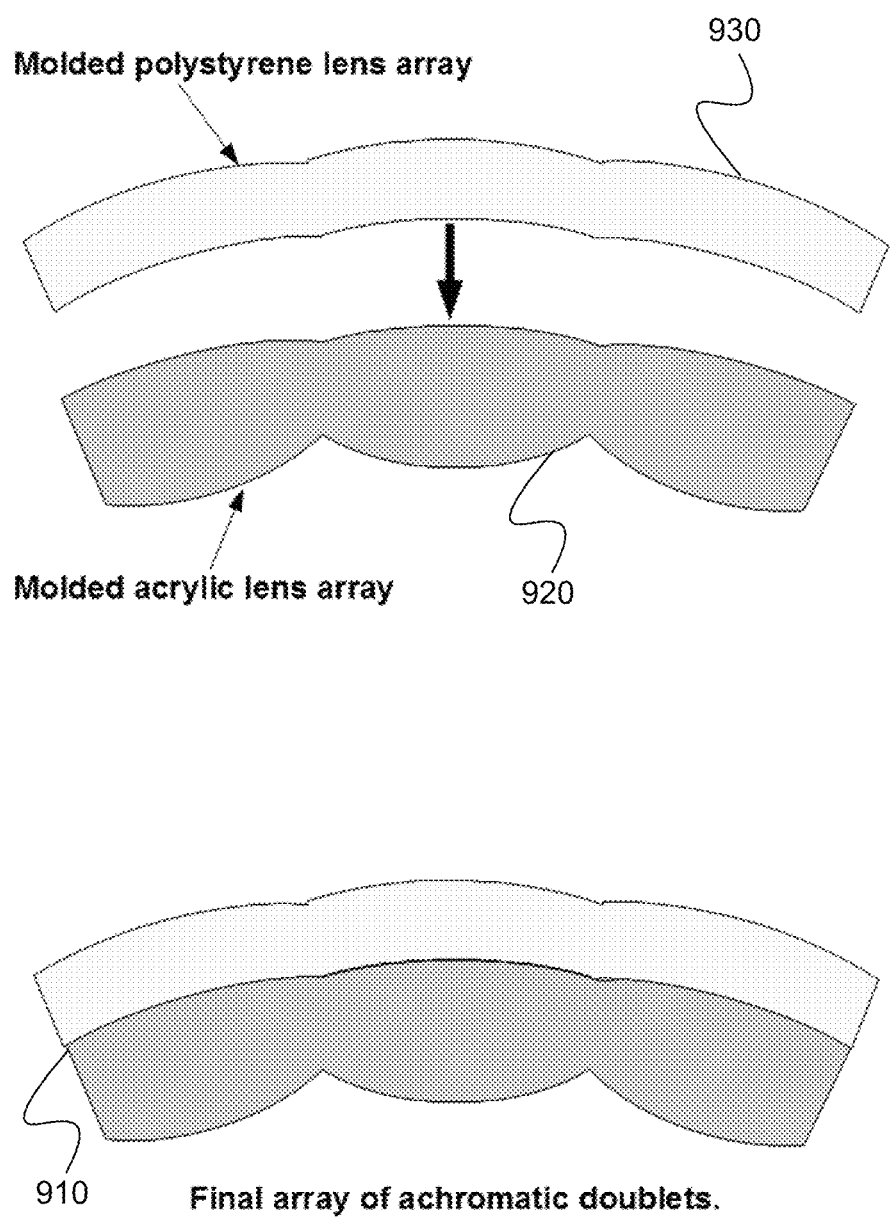
FIG. 9 is schematic diagram of the manufacture of a multi-surfaced tiled lens, in accordance with various embodiments.

FIG. 9 is schematic diagram 900 of the manufacture of a multi-surfaced tiled lens, in accordance with various embodiments. A multi-surfaced tiled lens 910 is manufactured by molding two or more lenses of a first material together forming a first semi-curved lens 920, molding two or more lenses of a second material together forming a second semi-curved lens 930, and bonding the first semi-curved lens and the second semi-curved lens together producing multi-surfaced tiled lens 910.

Figure 10:
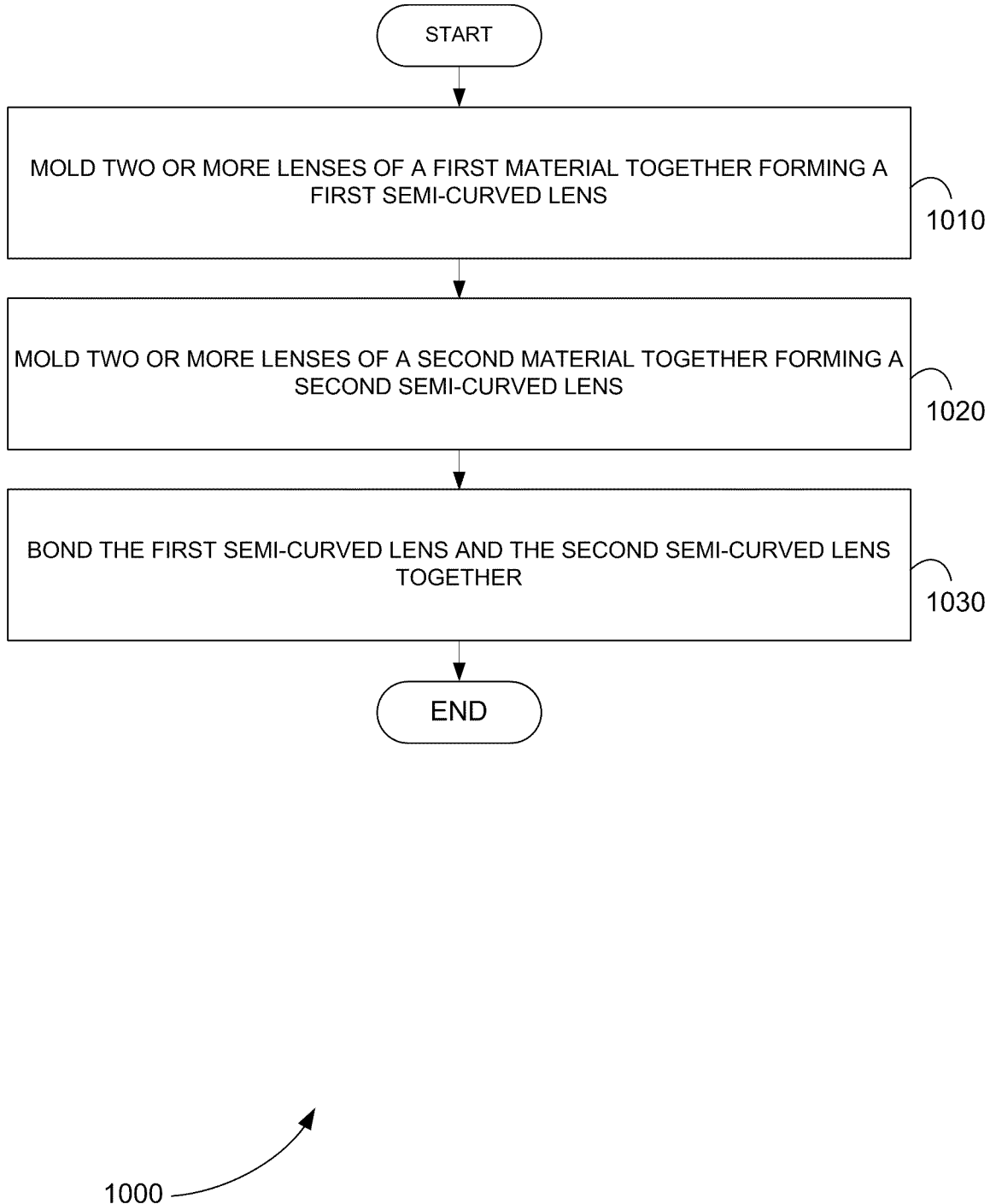
FIG. 10 is a flow chart showing a method for manufacturing a tiled lens for a tiled personal viewing device, in accordance with various embodiments.

FIG. 10 is a flow chart showing a method 1000 for manufacturing a tiled lens for a tiled personal viewing device, in accordance with various embodiments.

In step 1010 of method 1000, two or more lenses of a first material are molded together forming a first semi-curved lens.

In step 1020, two or more lenses of a second material are molded together forming a second semi-curved lens.

In step 1030, the first semi-curved lens and the second semi-curved lens are bonded together.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be further understood by the numbered examples appended hereto, and by their equivalents.

What is claimed is:

1. A personal viewing device for overlaying images, comprising:
   a mount;
   a camera attached to the mount, the camera configured to generate a first image;
   an electronic display attached to the mount, the electronic display configured to present an overlaid image;
   an electronic circuit that is attached to the mount, the electronic circuit configured to process the first image to identify a position and an orientation of the personal viewing device relative to an object within a field of view of the camera;
      produce a second image comprising annotations, the annotations produced based on the position and the orientation of the personal viewing device relative to the object, and
      overlay the first image with the second image to produce the overlaid image; and
      display the overlaid image on the electronic display;
   a lens attached to the mount and positioned by the mount so that an eye views the electronic display through the lens; and
   a second electronic display attached to the mount, a second lens attached to the mount and positioned by the mount so that a second eye views the second electronic display through the second lens, and a mechanical adjustment device that allows the position of the electronic display and the lens to be adjusted relative to the position of the second electronic display and the second lens;
   wherein an amount of overlap of an image seen by the eye and the second eye is increased or decreased upon adjustment of the position of the electronic display and the lens relative to the position of the second electronic display and the second lens;
   a first eyepiece including the electronic display and the lens; and
   a second eyepiece including the second electronic display and the second lens;

wherein both the first eyepiece and the second eyepiece are rotatable towards each other, via the mechanical adjustment device, to a first configuration in which the optical axis of the first eyepiece and the optical axis of the second eyepiece are parallel to each other, and wherein both the first eyepiece and the second eyepiece are rotatable away from each other, via the mechanical adjustment device, to a second configuration in which the optical axis of the first eyepiece and the optical axis of the second eyepiece are not parallel to each other.

2. The personal viewing device of claim 1, wherein the first image comprises an input image and the second image comprises a graphic image of symbols, letters, or drawings.

3. The personal viewing device of claim 1, wherein the second image comprises status information of the personal viewing device.

4. The personal viewing device of claim 1, wherein the second image comprises an advertisement.

5. The personal viewing device of claim 1, further comprising:
a wireless transceiver attached to the mount, the wireless transceiver configured to:
transmit telemetry data associated with the first image, and
receive a second image in response to transmitting the telemetry data, the second image based, at least in part, on the at least one of the position or the orientation of the personal viewing device relative to the object.

6. The personal viewing device of claim 5, wherein the wireless transceiver is in communication with a cellular phone.

7. The personal viewing device of claim 5, wherein the wireless transceiver is in communication with another wireless transceiver of another personal viewing device.

8. The personal viewing device of claim 1, further comprising an input/output interface for physically connecting one or more personal viewing device peripheral devices to the personal viewing device and electrically connecting the one or more personal viewing device peripheral devices to the electronic circuit.

9. The personal viewing device of claim 1, wherein the first image comprises a widescreen image and wherein the electronic circuit separates the first image into a first overlapping image for display on the electronic display and a second overlapping image for display on the second electronic display.

10. The personal viewing device of claim 1, wherein the electronic circuit is further configured to display different images on the electronic display and the second electronic display based on the electronic circuit determining (i) a first comparison between the resolution of the first image and the resolution of both the electronic display and the second electronic display and (ii) a second comparison between the aspect ratio of the first image and the aspect ratio of both the electronic display and the second electronic display.

11. The personal viewing device of claim 1, wherein the second image is based, at least in part on an input from a motor vehicle system, the input from the motor vehicle system conforming to the controller area network (CAN) standard.

12. The personal viewing device of claim 1, wherein
the camera is one of a plurality of cameras attached to the mount; and
the first image is based on a field of view of the plurality of cameras.

13. The personal viewing device of claim 1, wherein the second image is associated with an eye test application.

14. The personal viewing device of claim 1, wherein the electronic circuit system is configured to process the first image to identify a person within the field of view of the camera, the second image produced, based, at least in part, on the person being identified.

15. The personal viewing device of claim 1, wherein the second image is produced such that the overlaid image warns of an imminent collision with the object.

16. The personal viewing device of claim 1, wherein
the second image includes a virtual user interface;
the object is a portion of a body of a user of the personal viewing device; and
the electronic circuit is configured to process the first image to identify a gesture of the user representing an interaction with the virtual user interface.

17. The personal viewing device of claim 1, wherein the mount is configured to be worn on a head of a user.

18. The personal viewing device of claim 1,
wherein an increase or decrease of the of the overlap of the image is based on the personal viewing device configuring the image by sensing an amount of adjustment of the position of the electronic display and the lens relative to the position of the second electronic display and the second lens.

19. The personal viewing device of claim 1, further comprising
a processor included in the electronic circuit, the processor configured to adjust a contrast of the first image generated by the camera.

20. The personal viewing device of claim 1, further comprising a processor included in the electronic circuit, the processor configured to execute a business application that is an online marketplace for applications for personal viewing devices.

* * * * *